(12) United States Patent
Salinas-Fernández et al.

(10) Patent No.: US 6,379,421 B1
(45) Date of Patent: Apr. 30, 2002

(54) METHOD AND APPARATUS REMOVING UNDESIRABLE METALS FROM IRON-CONTAINING MATERIALS

(75) Inventors: Mario Alberto Salinas-Fernández, Monterrey; Maria Teresa Guerra-Reyes; José Mariá Eloy Aparicio-Arranz, both of San Nicolás de los Garza; Juan Antonio Villarreal-Treviño, Guadalupe; Miguel Angel Pedroza-Contreras, Monterrey, all of (MX)

(73) Assignee: Hylsa S.A. de C.V., San Nicolas de los Garza (MX)

( * ) Notice: Subject to any disclaimer, the term of this patent is extended or adjusted under 35 U.S.C. 154(b) by 0 days.

(21) Appl. No.: 09/505,811

(22) Filed: Feb. 17, 2000

Related U.S. Application Data

(60) Provisional application No. 60/121,561, filed on Feb. 25, 1999.

(51) Int. Cl.$^7$ .......................... C22B 1/214; C22B 13/02; C22B 17/02; C22B 19/30
(52) U.S. Cl. ............................ 75/444; 75/659; 75/669; 75/694; 75/695; 75/769; 588/235; 266/156; 266/157; 266/172; 266/195; 266/197; 266/249
(58) Field of Search .......................... 75/444, 659, 669, 75/694, 695, 766, 769, 962; 588/235; 266/176, 248, 156, 157, 172, 195, 197

(56) References Cited

U.S. PATENT DOCUMENTS

| 1,705,128 A | | 3/1929 | Matzel |
| 1,800,856 A | * | 4/1931 | Bradley .................. 75/434 |
| 1,816,743 A | | 7/1931 | Queneau |
| 2,977,216 A | * | 3/1961 | Whaley .................. 266/172 |

(List continued on next page.)

FOREIGN PATENT DOCUMENTS

WO    WO 97/45564    12/1997

OTHER PUBLICATIONS

Derwent–Acc–No. 1970–36843R for CA 842147 A by Metallges Ag Duisberger K, Sep. 16, 1965. Abstract only.*

Derwent–Acc–No. 1983–01632K for SU 908534 B by Gasanoz et al, Feb. 28, 1982. Abstract only.*

(List continued on next page.)

Primary Examiner—Roy King
Assistant Examiner—Tima McGuthry-Banks
(74) Attorney, Agent, or Firm—A. Thomas S. Safford; Frommer Lawrence & Haug LLP

(57) ABSTRACT

The present invention relates to a method and apparatus for separating undesired toxic metals, such as Zn, Pb and Cd, from iron-containing materials by: sintering a mixture of such materials (typically including EAF dust and mill scale) with carbonaceous particles to form sturdy sinter lumps; preheating such lumps in a non-reducing atmosphere, if needed, to achieve an elevated temperature generally above the vaporization temperature of the undesired metals, but below the sticking temperature of iron-containing lumps (which is typically below the vaporization temperatures of such undesired metals in their oxide form), feeding the lumps at such elevated temperature into a reduction reactor; flowing hot reducing gas through lumps to volatilize undesired reduced metals and carry the volatilized metals out of reduction reactor leaving the iron-containing lumps largely stripped of the undesired metals and ready for discharge and safe and/or useful disposal or re-use, and finally cooling the off gas from the reactor to separate out the resulting solidified unwanted metals (typically in their oxide form resulting from a water quench cooling).

17 Claims, 4 Drawing Sheets

U.S. PATENT DOCUMENTS

| | | | |
|---|---|---|---|
| 3,776,533 A | * 12/1973 | Vlnaty | ......................... 266/172 |
| 4,396,423 A | 8/1983 | Stephens, Jr. et al. | |
| 4,473,519 A | 9/1984 | Hasenack | |
| 4,673,431 A | 6/1987 | Bricmont | |
| 4,963,182 A | 10/1990 | Bishop et al. | |
| 5,013,532 A | 5/1991 | Sresty | |
| 5,028,034 A | 7/1991 | Bishop et al. | |
| 5,186,742 A | 2/1993 | Hoffman et al. | |
| 5,470,375 A | 11/1995 | Greenwalt | |
| 5,474,592 A | 12/1995 | Bresser et al. | |
| 5,589,118 A | 12/1996 | Ford, Jr. et al. | |
| 5,667,553 A | 9/1997 | Keegel, Jr. | |
| 5,667,556 A | 9/1997 | Orth et al. | |
| 5,685,524 A | * 11/1997 | Jaffre et al. | ................... 266/173 |
| 5,865,875 A | 2/1999 | Rinker et al. | |
| 5,885,328 A | 3/1999 | Markarian et al. | |
| 5,961,690 A | * 10/1999 | Kepplinger et al. | ............ 75/446 |
| 6,086,653 A | * 7/2000 | Joo et al. | ........................ 75/491 |

OTHER PUBLICATIONS

Morley M. Harris, "The Use of Steel–Mill Waste Solids in Iron and Steelmaking," pp. 21–30, (United States Steel Research Laboratory), published in "Disposal, Recycling, and Recovery of Electric Furnace Exhaust Dust" Selection and Organization of the Papers contained herein provided by Mr. R. Kaltenhauser, Iron and Stel Society, Inc. 1987 [1987 (ISBN: 0–932897–22–3, Library of Congress Catalog No. 87–81393].*

R. C. Stanlake et al. (Dominion Foudries and Steel, Limited), "Reduction of Waste Oxide for Zinc Removal"; Waste oxide recycling in steel plants, $2^{nd}$ McMaster Symposium on Iron and Steelmaking, Proceeding Papers; Hamilton, Ontario, May 16–17, 1974. Paper 12 (25 pages), pp. 13–1 to 13–17.

Arthur E. Morris et al., "Treatment Options for Carbon Stell Electric arc Furnace Dust", pp. 35–50, (University of Missouri–Rolla & Rolla Research Center, U.S. Bureau of Mines), published in: "43RD Electric Conference Proceedings", Iron and Steel Society, Dec. 10–13, 1985, vol. 43, Atlanta Meeting.

Chris W. Avent et al., "Environmental Regulation of Electric Furnace Dust Alternatives and Decisions", pp. 51–65; Electric Furnace Conference Proceedings; vol. 44; Dallas Meeting, Dec. 9–12, 1986, Iron & Steel Society of AIME (American Institute of Mechanical Engineers).

Gero Rath et al., "The Inmetco–RHF Technology for DRI Production and its Downstream Application", May 6–8, 1996, session 13: paper 4: pp. 4/1–4/18, (South East Asia Iron & Steel Institute; $25^{th}$ Anniversary SEAISI 40 Conference on Compact Integrated Steel Technology).

Brooks et al., "Searching for tips on Mill Waste Recycling", 8/96 33 Metal Producing, pp. 29–30, 32,34,54, & 56.

Pacific NW Pollution Prevention Research Center, project title: "Recycling of Electric Arc Furnace Dust", downloaded from the internet Jan. 19, 1999, from http:// 198.128.66.29/pprc/rpd/statefnd/illinois/recyc1.htm "Last updated: 1/96".

T.J. O'Keefe, "Design and Development of an Innotivative Industrial Scale Process to Economically Treat Waste Zinc Residues", downloaded from the internet Jan. 19, 1999 from http:// es.epa.gov/ncerqa_absrtacts/centers/hsrc/metals/design.htm Last updated: Dec. 29, 1997.

Pacific NW Pollution Prevention Research Center, project title: "Recycling of Electric Arc Furnace Dust", downloaded from the internet Jan. 19, 1999, from http://198.128.66.29/pprc/rpd/fedfund/epa/epastd/recycli2.htm "Last updated: 5/96".

T. Corsini, "Treatment of EAF dust by a leachant process", p. 400, Oct. 1994, Steel Times.

H. J. Lehmkuhler et al., "Reclamation of Iron and Steelmaking Dusts, Sludges and Scales Using the Inmetco Technology", pp. 237–251; Conference: Pretreatment and reclamation of dusts, sludges and scales in steel plants, Hamilton, Ontario, Canada, May 11–13, 1993, Publication of: McMaster University, Hamilton, Ontario L8S 4L7, Canada, 1993.

R. Nicolle et al., "A Review on The Behaviour of Zinc in Blast Furnaces and Zinc Removal in the Preparatory Processes", pp. 12–1 to 12–17, (Department of Metallurgy & Materials Science, McMaster University, Hamilton, Ontario, Canada); Waste oxide recycling in steel plants, $2^{nd}$ Mc Master Symposium on Iron and Steelmaking, Proceeding Papers; Hamilton, Ontario, May 16–17, 1974, Paper 12, (25 pages).

* cited by examiner

METHOD AND APPARATUS REMOVING UNDESIRABLE METALS FROM IRON-CONTAINING MATERIALS

RELATED APPLICATION

This application is a continuation-in-part of U.S. Provisional Application No. 60/121,561, filed Feb. 25, 1999.

FIELD OF THE INVENTION

The present invention relates to methods and systems for removing undesirable metals from iron-containing waste materials produced in the steelmaking industries, such as Electric Arc Furnace (EAF) dusts or mill scale. In particular, this invention describes methods and systems for removing one or more toxic metals as for example: zinc, cadmium, lead, and others from such iron-containing wastes and recycling the iron contained for its utilization in steelmaking.

BACKGROUND OF THE INVENTION

The steel industry produces each year large quantities of wastes which desirably could be recycled and utilized after proper treatment for economic value and for compliance with environmental regulations, for example: Electric Arc Furnace (EAF) dusts, mill scale, iron ore fines, etc., with the EAF dusts and mill scale being typically the principal sources. Particularly the EAF dusts pose a difficult problem to steel producers regarding their handling and disposal due to the leachable toxic elements they contain (resulting in being classified by the U.S. Environmental Protection Agency as a hazardous waste). Each year the EAF steelmaking plants produce about 650,000 metric tons of EAF dusts, as reported in 1996.

Because of environmental concerns and costs, there is a continuing interest in developing commercially-viable treatments that have the ability to recover metal values, render the dusts less hazardous and/or gain beneficial use by re-utilizing the metals. Zinc is the contained metal value usually considered for recovery, followed by iron. The amount of zinc available for recovery is expected to increase in the future as galvanizing becomes ever more common for rust-proofing automotive steels.

There are numerous proposals in the literature for removing the toxic metals: zinc, cadmium, and lead from iron wastes, especially with increased regulation in the last decade, having the aim of recycling and/or safely disposing of the wastes. Few of these appear to have been used even as marginally acceptable commercially (primarily because of cost), and none have proven to be universally practical, even when limited to only EAF dust. See the article entitled "Treatment Option for Carbon Steel Electric Arc Furnace Dust", by Arthur E. Morris et al, (University of Missouri-Rolla & Rolla Research Center, U.S. Bureau of Mines). See also U.S. Pat. No. 5,667,553 for a representative collection of background literature and patents (beginning with an Arthur D. Little, Inc. report "Electric Arc Furnace Dust-1993 Overview, A Summary of Dust Generation, Status of Regulations, Current and Emerging Treatment Processes, and Processing Costs"). These prior processes can be generally classified as pertaining to three categories:

(a) Removal of the toxic metals by hydrometallurgical processes. These methods require carrying out the chemical reactions in aqueous environments and have the objection of being costly, adding to landfill bulk and/of producing large volumes of polluting effluents.

(b) Agglomerating the dusts in combination with coal, coke or other hydrocarbon and heating and thereby reducing the metallic oxides at a highly elevated temperatures. Here the undesirable metals are evaporated and separated from the reduced metallic iron and condensed for their utilization or disposal;

(c) Agglomerating the EAF dusts and reducing them with a gaseous reductant, such as hydrogen, carbon monoxide or mixtures thereof, at high temperature in fixed or fluidized bed reactors and separating the undesired metals by condensation thereof outside the reduction reactor. These latter methods are preferred for in site treatment of the wastes.

The most used methods for the processing of electric-arc-furnace fines and the recovery of undesirable metals like zinc, lead and cadmium, involve the operation of horizontal rotary kilns, flat rotary hearth furnaces and grate furnaces, but up to date there have been few, if any, proposals for utilizing efficient moving bed reduction reactors for this purpose.

The following patents were found by applicants relative to the present invention: U.S. Pat. No. 4,673,431 to Bricmont; U.S. Pat. No. 5,013,532 to Sresty; and U.S. Pat. No. 5,470,375 to Greenwalt. These and the other patents and articles cited herein are incorporated by reference.

Bricmont (U.S. Pat. No. 4,673,431) relates to an electric arc furnace dust recovery process wherein pellets are formed from a waste dust and are charged to an oxidizing chamber 14 in an oxidizing atmosphere. The chamber is heated to quite high temperatures (e.g. 2700° F., i.e., 1482° C.), sufficiently to vaporize lead oxide and oxides of cadmium, potassium and sodium, if present, but not to vaporize zinc oxide or iron oxide. The vapors are drawn from the chamber with flue gases and delivered cooled to a bag house where flue gases are separated from solidified particles of the vapors. The residual oxidized mass is cooled after removal from the chamber and fed to a reduction chamber for further processing. Bricmont thus first separates the solidified particles of most of the undesirable metals from a residual oxidized mass of iron and then the iron and zinc oxides are reduced to metallic iron and zinc for further separation by volatilization of the zinc. The high temperature separation of zinc in its oxide form would appear to be unnecessarily expensive in view of the present invention as discussed below.

Sresty (U.S. Pat. No. 5,013,532) describes a process for recovery of metals from EAF dust wherein the raw material is charged to a furnace in the form of pellets, briquettes, granules or lumps and is heated sufficiently to permit vaporization and removal of the undesired metals by a flowing gas stream. To this end an excess of hydrogen gas is introduced into the furnace to reduce the metal oxides and sweep the vapors out of the furnace. The hydrogen gas containing the metallic vapors is cooled down with water and the condensed metals are separated in a bag filter. The main characteristics of Sresty is that hydrogen is the sole reducing agent and that hydrogen is regenerated by reaction of the zinc metal swept from the flue dust with the water during a reoxidation step.

Greenwalt (U.S. Pat. No. 5,470,375) describes a process for treating EAF dusts and petroleum refinery residues (with toxic metals) in a reduction reactor/melter gasifier combination where the refinery residues are fed to the melter/gasifier and the dust is agglomerated into ½ inch particles with lime or Portland Cement, "allowed to age", and then fed to a reductive reactor. Reducing gas is generated in the melter gasifier, sweeps through the reduction reactor, and carries off vapors or aerosols of zinc, cadmium and lead for subsequent separation and recovery.

One of the objectives of the present invention is to recover safely yet economically undesirable metals like zinc, chromium, cadmium, and mixtures thereof contained in EAF dusts, mill scale, iron ore fines, metallic powder, or other particulate iron-containing materials, particularly waste and other by-products of the steel-making industry. Another object of the invention is to recover the iron content of such materials, producing a pre-reduced product or direct reduced iron. Another object of the invention is to reduce the impact of the steel-making industry and to reduce the EAF dust deposits accumulating in the world in an environmentally acceptable manner.

Other objects and advantages of the invention will be evident to those skilled in the art or will be described in this specification of the invention and appended drawings.

SUMMARY OF THE INVENTION

The objects of the present invention are generally achieved by providing processes and apparatus for recovering undesirable metals from iron-containing materials and for recycling the iron content of said materials, including as one preferred embodiment a method comprising: sintering said iron-containing material producing sinter masses; breaking as may be needed such oxidized mass(es) into manageable sinter lumps; separating sinter lumps of a size above about ¼ inch from sinter fines and recycling the latter; preheating, if necessary, said sinter lumps in a non-reducing atmosphere to achieve a temperature higher than about 650° C. and preferably at least 690° C., and more preferably equal to or higher than about 800° C. (but normally less than about 1200° C., to avoid particle sticking); introducing said hot sinter lumps to a reduction reactor; introducing a reducing gas within a temperature range preferably of about 850° C. to about 1200° C. into said reduction reactor, contacting said sinter lumps with said reduction gas within said reduction reactor at a temperature effective under the prevailing conditions to reduce said hot sinter lumps to metallic iron and to melt and sufficiently vaporize said toxic metals (specifically at least one of Zn, Cd and Pb) to separate such toxic metals from such lumps by entrainment into said reducing gas; withdrawing said reducing gas from said reduction reactor as an off reducing gas along with vapors and/or entrained molten aerosols of said undesirable metals, said off reducing gas exiting said reactor at a temperature equal to or higher than about 650° C. and preferably higher than 900° C. in order to avoid premature condensation of the heavy metals within the reduction reactor, in the associated ducting, or on the feed materials; cooling said off reducing gas to a temperature low enough to condense and solidify said vapors of undesirable metals; and, separating said condensed undesirable metals (which can be in the form of oxides or free metals, the oxide resulting from sufficient exposure to water and the latter requiring special handling to avoid pyrotechnic exothermic reoxidation in air).

To achieve a process economically suitable for treatment in a moving bed reactor, it is required to have a material in lump or other particulate form with sufficient mechanical strength in order to withstand high temperature, pressure and abrasion, especially within the vertical moving bed reactor.

In order to separate said condensed undesirable metals, a metals separation unit is used, which could be a bag house unit. When installation of a bag house is not suitable, the undesirable metals can be recovered by other means, such as by washing said off gas stream with water, thereby producing a sludge containing oxides of the undesirable elements. This sludge can be further treated and the undesirable metals recovered by means known in the art, as for example a clarifier and a filter.

As mentioned above, in order to have a material with sufficient mechanical strength, it is required to have a strong sinter product. In the steel-making industry, there are two common forms of deposited EAF dust and mill scale produced as by products, in a dry form and a wet form. When the dust and scale are recovered by scrubbers and separated from water as sludge, the iron-containing material is recovered in form of lumps and have sufficient strength to be sintered with a suitable carbon containing material (the usual carbonaceous material used being coke). When the iron-containing material is dry and in form of fines, then in order to have a strong sinter product, it is necessary according to another more specific aspect of the present invention to agglomerate said fines in a special manner.

To obtain sinter product with sufficient strength and desirable porosity to meet the requirements for use in a moving bed reduction reactor, the inventive process combines the EAF dusts with coke, lime, mill scale, and a typical commercial binder material, with an appropriate water content sufficient to agglomerate as pellets, preferably with a diameter equal to or smaller than ⅜ in (9.53 mm). The preferred size of the pellets is about 1 mm to about 10 mm or slightly more. Recycled sinter fines can also be added as a component of the agglomerates. Such recycled fines are those screened particles which are less than about ¼ inch (6.35 mm) in diameter.

The composition of the material to be sintered can be very broad, since EAF dust and mill scale vary from a steel-making plant to another. A composition has been found to be effective where the iron containing ingredients were 60% mill scale and 40% EAF dust. Tests for increasingly larger percentages of EAF dust are in progress and likely will result in sinter produced from 100% EAF dust (with no mill scale). In order to have a strong sinter product, it has been found best to have a ratio of lime to silica within a range of 2.2 to 3.0, and preferably 2.5.

As an illustrative embodiment of the invention, but not restricted thereto, the following composition has been found in a sinter product which has the desired properties:

TABLE 1

| Compound | Range: % Weight |
|---|---|
| Total Fe | Maximum: 35.0 |
| FeO | 11.0–13.0 |
| $Fe_2O_3$ | 60.0–66.0 |
| Carbon | 0.02–0.06 |
| Sulfur | 0.03–0.17* |
| $SiO_2$ | 1.8–2.8 |
| $Al_2O_3$ | 0.6–0.7 |
| CaO | 5.0–6.6 |
| MgO | 0.5–1.7 |
| MnO | 0.7–1.6 |
| ZnO | 8.6–16.4 (Maximum: 20) |
| PbO | 0.4–0.9 |
| $Na_2O$ | 0.0–0.6 |
| $K_2O$ | 0.0–0.3 |
|  | Range: Ratio |
| $CaO/SiO_2$ | 2.2–3.0 |

*The sulfur content differs from one site to another, but is characteristic for a given plant.

As an example of the formulation of the material to be sintered, see the following list of ingredients:

TABLE 2

| Compound | Amount (Ton) |
| --- | --- |
| Coke | 0.09 |
| Water | 0.2 |
| Mill Scale | 1.5 |
| Sinter Fines | 1.1 |
| Lime | 0.1 |

As an example of the strength achieved by the sinter product according to the present invention, in a tumbler test ISO, 80% of the material gave a result of 6.3 mm or higher (where a good result for a sinter product is considered to require 70% of the material being 6.3 mm higher). This strength test was in accordance with the International Organization for Standardization's "International Standard ISO 3271, Iron Ores-Determination of tumble strength" in its third edition 1995-11-01: Reference number: ISO 3271:1995(E).

The following additional example illustrates the degree of removal of lead, zinc, and cadmium achieved when practicing this invention. The sinter product fed to the reduction reactor in this further test was:

TABLE 3

| Compound | % Weight |
| --- | --- |
| Total Fe | 53.16 |
| FeO | 12.20 |
| $Fe_2O_3$ | 62.00 |
| Carbon | 0.04 |
| Sulfur | 0.15 |
| $SiO_2$ | 2.03 |
| $Al_2O_3$ | 0.66 |
| CaO | 5.78 |
| MgO | 1.18 |
| MnO | 1.26 |
| ZnO | 12.50 |
| PbO | 0.52 |
| $Na_2O$ | 0.43 |
| $K_2O$ | 0.05 |

After this sinter was reduced, the laboratory results showed the following modified composition:

TABLE 4

| Compound | % Weight |
| --- | --- |
| Total Fe | 81.60 |
| Metallic Fe | 79.10 |
| $Fe_2O_3$ | ** |
| Carbon | 0.03 |
| Sulfur | 0.018 |
| $SiO_2$ | ** |
| $Al_2O_3$ | ** |
| CaO | ** |
| MgO | ** |
| MnO | ** |
| ZnO* | 0.32 |
| PbO* | 0.08 |
| $Na_2O$ | ** |
| $K_2O$ | ** |

*The ZnO and PbO are calculated from the amount of Zinc and Lead present in the sample as elements and then their weight as oxides thereof is calculated, but said elements can form compounds with elements other than oxygen.
**These compound were not analyzed in this test, not being of specific interest.

In subsequent additional tests, it has been determined that in the case where the iron-containing particles fed to the reduction reactor are in the form of sinter lumps, some removal of the toxic metals can occur during the sintering portion of the process. For example, a significant majority (even as much as 60–70%) of the cadmium present in the particles is commonly carried off in the flue gas from the sintering step and even as much as 25% of the zinc can similarly be driven off. The same can be true of other undesirable metals to a greater or lesser degree. Thus, the off gas from the sintering step can be treated by a separate separation unit for recovery of the undesired metals from the flue gas, such as by a quench cooler and a small sludge separator or baghouse (or even by combining the flue gas from the sinter plant with the off gas from the reduction reactor to thereby utilize the off gas metals separator for both and thus avoid the need for a separate separator for the flue gas, if that would not be too detrimental to the upgrading and recycling of the reducing off gas).

In the foregoing tables, no cadmium is listed. The amounts of cadmium in that experimental run, if any, were apparently too small to be measurable in the sinter (and the concentrations in the pre-sinter materials not having been indicated). From the following results of a more recent run, the likely reason for the absence of cadmium in the foregoing tables becomes somewhat clearer.

In the more recent run, 0.4% wt. of CdO was present in the materials fed to the sinter plant. 0.04% wt. of CdO (even less if figured as Cd alone) was present in metals recovered from the off gas of the reduction reactor in the baghouse (which latter percentage dose not even include the separated DRI), and no measurable amount was found in the DRI product from the reactor (i.e. the Cd content, if any, present in the DRI was probably considerably less than 0.03%, which latter is the smallest amount of any element measured for that run). From this, it can be seen that whatever of the Cd that was not recovered in the baghouse for the reducing off gas, was previously carried off in the sinter plant's flue gas.

In this more recent run, the chromium present in the materials fed to the sinter plant and the amount in the sinter lumps from the plant was about the same amount, namely on the order of 0.17% wt. of $Cr_2O_3$ (i.e. about 0.12% wt. of Cr); thus very little, if any at all, of Cr would have been present in the sinter plant's flue gas. 0.01% wt. of $Cr_2O_3$ (i.e. about 0.009% wt. of Cr) was present in metals recovered from the baghouse of the off gas from the reduction reactor, and no measurable amount was found in the DRI product from the reactor.

Under the Mexican environmental toxic waste standards (i.e. the Mexican Official Standard for the Characteristics, Proceedings of Identification, Classification and Lists of Dangerous Wastes, which current standard is called: NOM-052-ECOL-1993), the upper limits for leeching of undesirable metals from DRI-type materials are 5 ppm for Cr, Pb, & Zn and 1 ppm for Cd. In the DRI produced by applicants' foregoing method, the value calculated according to the aforementioned standard were 0.015 ppm Cr, 0.13 ppm Pb, 0.025 ppm Zn, and even less for Cd.

In this specification and in the accompanying drawings, the preferred embodiment of the invention is shown and described. Various alternatives and modifications thereof have been suggested, but it is to be understood that these are not intended to be exhaustive, and that many changes and modifications can be made within the scope of the invention. The suggestions herein described are selected and included for illustrative purpose only, in order that others skilled in the art will more fully understood the invention and the principles thereof and will thus be enabled to modify it in a variety of forms, each as may be best suited to the conditions of a particular use.

DETAILED DESCRIPTION OF PREFERED EMBODIMENTS OF THE INVENTION

Preferred embodiments of the invention are herein described as applied to the treatment of Electric Arc Furnace (EAF) dusts or mill scale, in particular. However, it will be understood that the invention in its broader aspects can be adapted to plants for processing other similar of materials containing iron with zinc, cadmium and/or lead compounds. The embodiment described is a continuous-mode process, particularly useful for treatment of zinc-laden iron-containing materials (such as are typically present in EAF dust where automotive galvanized steel scrap has been charged to the EAF). Even though this continuous mode is preferable, it is obvious to those skilled in the art that the invention could be applicable in a batch-mode process and still be within the scope of the invention in its broader aspects.

Figure 1:
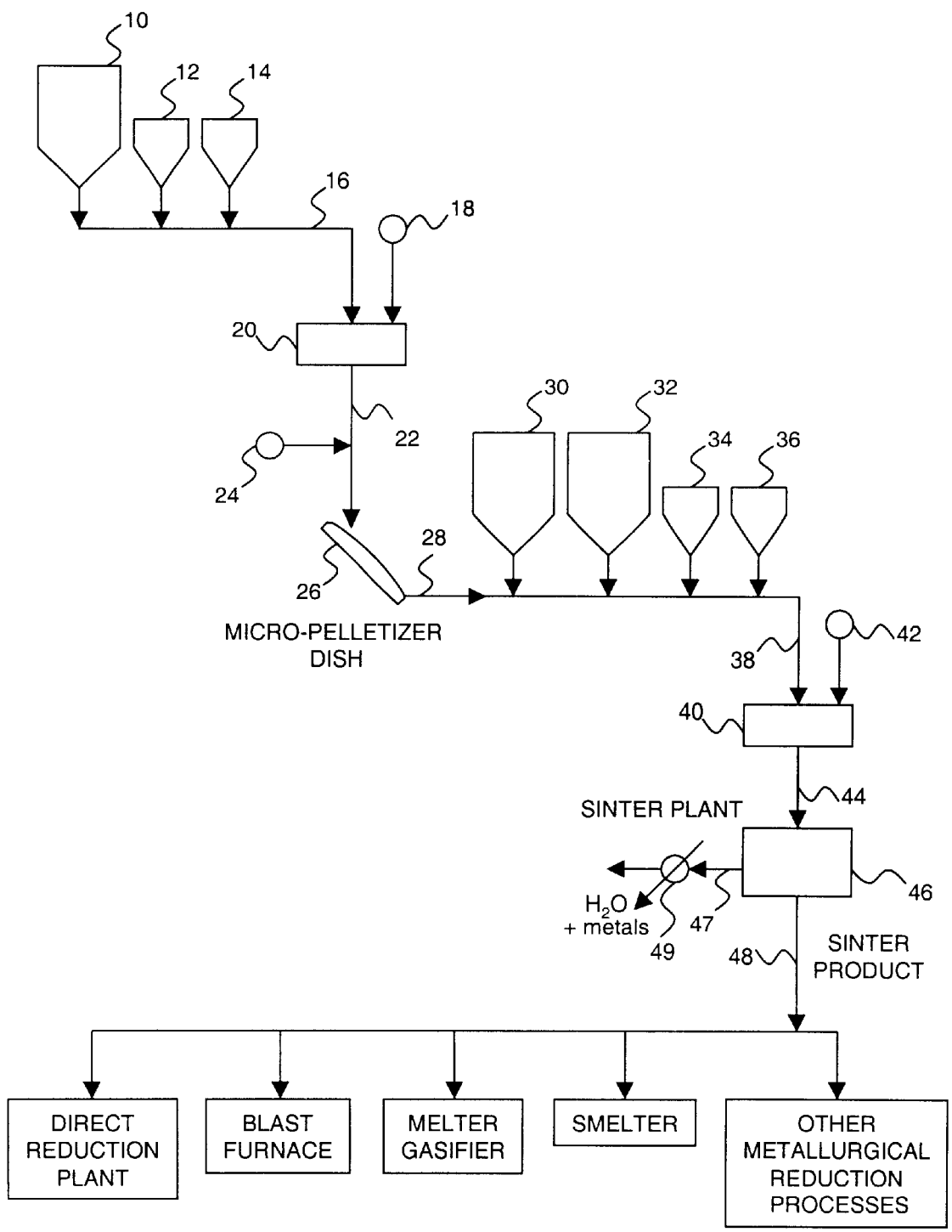
FIG. 1 schematically shows a preferred embodiment of the present invention illustrating process and apparatus for preparation and use of sinter particles in the form of lumps of EAF dust and/or mill scale agglomerated and fired with an appropriate binder to sinter mass(es) and crushed to particulate sizes appropriate for further processing.

FIG. 1 shows schematically an embodiment for the production of the sinter particles when the EAF dust is present in a dry form and needs to be pelletized. A stream 16 comprised of EAF dust 10, a suitable commercial binder 12 (such as ALCOTAC brand organic binder, or $Ca(OH)_2$), and coke 14, are mixed with a first stream of water 18 by means of a first mixer 20. After this first mixer 20, the resulting stream 22 is adjusted with a second stream of water 24 and is pelletized by means of a pelletizer dish 26, forming micro-pellets 28 with an average diameter of about ⅜ in. (9.53 mm). Said micro-pellets 28 are combined with mill scale 30, recycled sinter fines 32, lime 34 and coke 36 forming a stream of enriched micro-pellets 38. Enriched micro-pellets 38 are mixed with water 42 in a second mixer 40 producing a stream of wet enriched micro-pellets 44 with a suitable humidity, preferably within a range of about 5 to 9% by weight of water present (and more preferably in a range of about 6 to 8% by weight of water). Stream 44 is fed to a sinter plant 46 to finally produce sinter mass(es) which are crushed and screened to result in a sinter product stream 48 in form of lumps of a suitable size for handling in a moving bed reactor 110 (see FIG. 2 or 3). The sinter plant can be any of a number of commercially available continuous or batch operated plants (e.g. rotary hearth, stationary vessel, etc.). The batch process typically would form a sinter mass, which is crushed and screened to form lumps preferably in a size ranging from ¼ inch to 1½ inches, with small fine being recycled to bin 32. This sinter product stream 48 with suitable strength properties could be used as a feed material in direct reduction plants, blast furnaces, melter gasifier, smelter or other metallurgical reduction processes.

If EAF dust is collected in wet form (such as from wet air pollution control scrubbers), this slurry can be dried to form caked lumps to be mixed with coke and used in lieu of micro-pellets 28.

The sinter lumps of this invention not only have the desired mechanical properties, but also a size and porosity that allows rapid and thorough reduction and vaporization of the undesired metals, since the intimate mixture of coke or equivalent carbonaceous substitute particles upon heating in an oxidizing atmosphere assure combustion and heating within the core of the lumps and gasification of much of the interior solids in the lumps thus opening channels of access to the lump interior for more effective treatment of the porous strong sinter lumps fed to the reduction reactor at elevated temperatures.

Since the temperature to vaporize the undesirable metals present in the iron-containing material is lower when present as metallic elements than when present as oxides, the removal of said undesirable metals is performed in a direct reduction furnace of the moving-bed type.

To avoid or minimize premature condensation of the undesired metals within the reduction reactor, the related ducting, and on any cold added charge to the reduction reactor, the sinter lumps to be charged to the reduction reactor are preheated in an inert or oxidizing atmosphere, and the reduction reactor and the ducting means are maintained at a temperature sufficient to avoid premature condensation of the heavy metals entrained in the off gas. Since the vaporization temperatures of the undesired metals in their oxide form are much higher than in their metallic form, the sinter lumps are preheated, preferably using a non-reducing gas, whereby removal of the undesirable metals is discouraged and normally eliminated during preheating. If the sinter lumps are already at sufficiently high temperature from the sintering step (and have not been cooled too much), then a separate preheating step may not be needed. If it is determined that reasonably significant amounts of the undesirable metals in the iron-containing materials are present in the sinter plant's off gas (flue gas) 47, then a separator 49 (shown as a water scrubber, but can be of any effective known type) can be employed to recover these metals for proper handling.

Figure 2:
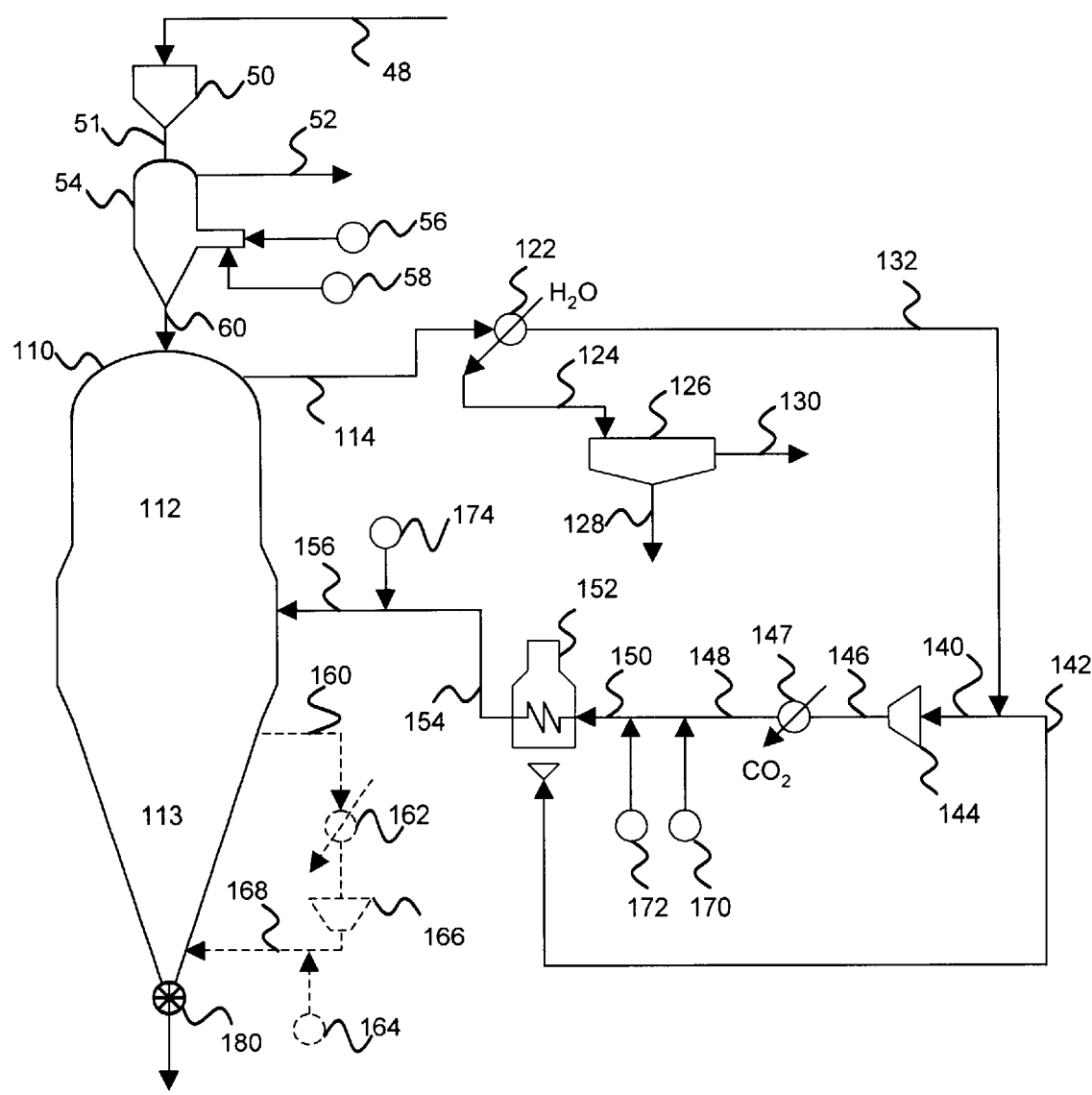
FIG. 2 illustrates schematically, as a preferred embodiment of a further aspect of the present invention, a reactor (similar to, but on a much smaller scale than, a typical direct reduction plant reactor for the production of sponge iron), which is adapted for the preferred processing of at least the product received from the process illustrated in FIG. 1 by the additional features of a sinter product preheater/feed assembly to the reactor and a concentrating/separation unit fed by waste water from the quench-cooler of the off reducing gas for the recycle line of the reduction reactor.

FIG. 2 shows an embodiment of the invention wherein the removal of the undesired metals is performed by means of a quench of the recycle gas with an excess of water to obtain a sludge containing most of the undesirable metals originally present in the sinter. More specifically, FIG. 2 shows a stream 48 of sinter product from the downstream end of the sintering apparatus 46 illustrated in FIG. 1, which is fed to a feeding means 50 (illustrated as an accumulating hopper). The sinter product is then passed on as a stream 51 to be heated in a preheater 54. The preheater prevents premature cooling of the reducing gas, so that condensation of metal vapors in such gas will occur outside the reactor 110. The preheater 54 is supplied with a suitable fuel 56 and air or air enriched with oxygen 58 to produce a flame to preheat the sinter material to a temperature equal to or higher than about 650° C. and preferably equal to or higher than about 800° C. Part of fuel 56 can be from part of the purge gas 142 from the recycle stream 114/156. The atmosphere present inside the preheater 54 could be an inert atmosphere or an oxidizing atmosphere. Stream 52 represents the gas exiting said preheater (which, if an inert gas, could be used for rendering inert the atmosphere in other equipment, when needed).

After the preheater, the heated sinter product 60 is fed to the reduction reactor 110 having at least a reduction zone 112 and a discharge zone 113. Within reactor 110, the hot material fed is contacted with a hot reducing gas 156 in order to reduce said material. After the hot reducing gas has at least partially reduced said preheated sinter product 60 within said reduction zone 110, this gas is withdrawn as an off gas stream 114 carrying with it the vapors and any molten aerosols of the undesirable metals, preferably still at high temperature, and more particularly at a temperature equal to or higher than about 700° C. The temperature of the stream 114 should be higher than the vaporizing temperature of the undesirable heavy metals, and can change depending on the pressure of the system, the amount of zinc, cadmium or lead present in the preheated sinter material.

The off gas 114 is passed through a gas cooler 122, wherein said gas cooler 122 can be a water quench unit. The water not only cools the gas, but also normally oxidizes and then solidifies the undesired metal in their oxide form (i.e. the form with the higher melting temperatures that is more stable in air). The gas cooler 122 produces a clean cold gas 132 and a first sludge 124, which is further processed in a metals separation unit 126 to concentrate the sludge as a second sludge 128 that can be further treated to recover the undesirable metals as oxides therefrom. Water 130 withdrawn from metals separation unit 126 can be further treated for its reuse.

Stream 132 is divided in at least two portions, where a first portion 142 is sent to be burned as a supplementary fuel and, a second portion 140 passes through a pressurizing means 144 (such as a compressor) producing a pressurized recycled gas 146. Pressurized recycle gas 146 passes through a $CO_2$ removal unit 147, producing a stream 148 that has a lower $CO_2$ content. Stream 148 is combined with make up gas in the form of steam 170 and natural gas or reducing gas 172 to form a stream 150, which is passed through a gas heater or gas reformer 152 producing an improved reducing gas stream 154. Oxygen or air enriched with oxygen 174 can be added to said hot gas stream 154 to increase its temperature producing a hot reducing gas stream 156 at a temperature within a range of about 850° C. to 1,200° C. The reduced material remaining within the reduction reactor comprises mainly a prereduced product (which, depending upon the degree of metallization, can be direct reduced iron (DRI), also known as sponge iron). This is withdrawn from the discharge zone 113 by regulating means 180. From the discharge zone 113, the DRI could be discharged hot or alternatively could be cooled by a cooling system (comprising the introduction of a cooling gas stream 168 to said discharge zone 113 and the withdrawal of an off cooling gas 160). The cooling gas 168 can be made up of natural gas supplemented or replaced by gas from the recycled reducing gas stream 146. The off cooling gas 160 is cooled in unit 162, pressurized by pressurizing means 166, and combined with a cooling makeup gas 164, which is preferably natural gas, to produce the cooling gas stream 168. In lieu of a cooling gas loop, the off cooling gas 160 could be fed to join with the off gas 114 (see FIG. 4), thereby saving the cost of a separate compressor 166.

Figure 3:
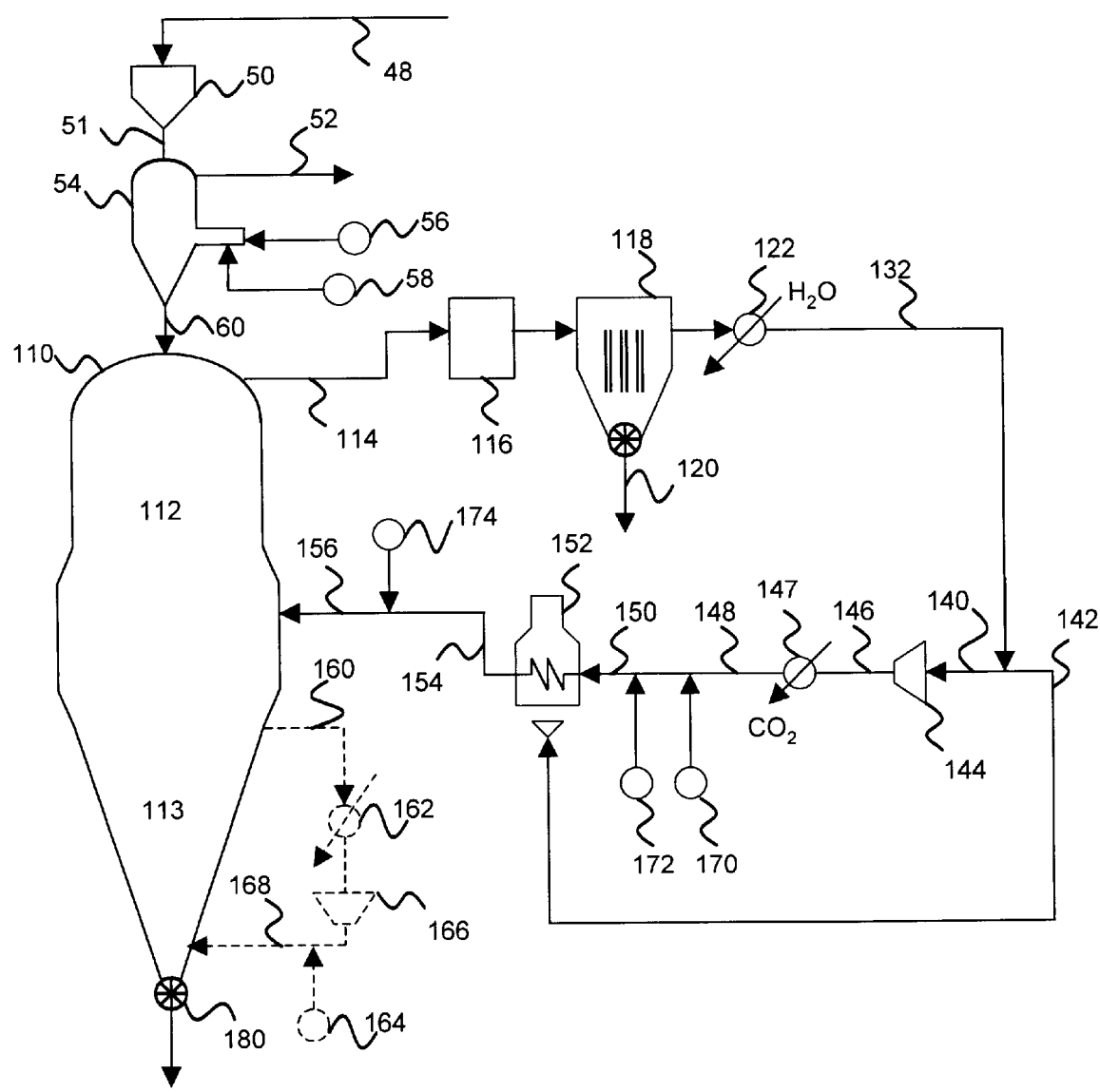
FIG. 3 illustrates schematically a similar embodiment to that shown in FIG. 2, modified to have a different undesirable metal recovery unit, where the quench cooler is replaced (1) by a humidifier that cools by injection of enough water to cool and oxidize yet be entirely evaporated, and (2) by a bag house in the reducing gas recycle line (downstream of the humidifier to collect solidified particles of the unwanted metals/oxides).

FIG. 3 shows an embodiment of the invention wherein the removal of the undesired metals is performed by means of a cooling solids/separation system 116 with no liquid effluent. Cooling can be by a mist quench of water (sufficient to cool but not in such excess to have any non-evaporated water), thereby obtaining a condensation of said metals at a temperature suitable to be separated by means of a solid separator (illustrated as a bag house 118). The solids obtained from said metals separation unit are the undesirable metals which have been reduced and thus are in their metallic form. More particularly, FIG. 3 describes an embodiment similar to the embodiment shown in FIG. 2 with the difference that the off reducing gas stream 114 is passed through a gas cooling unit 116 wherein said gas is cooled sufficiently to condense the undesired metals, preferably to achieve an operational temperature of about 200° C. (which for the illustrated embodiment is near the current limit for using a bag house) and to feed said gas to a dust collector system 118 (which preferably is a bag house). From said dust collector system 118, the undesirable metal elements are obtained normally in their solidified oxide form as stream 120. Also obtained is a stream of clean gas that has to be further cooled in a gas cooler 122 with the resulting gas being a clean cold gas stream 132 that continues as has already been described relative to FIG. 2.

Figure 4:
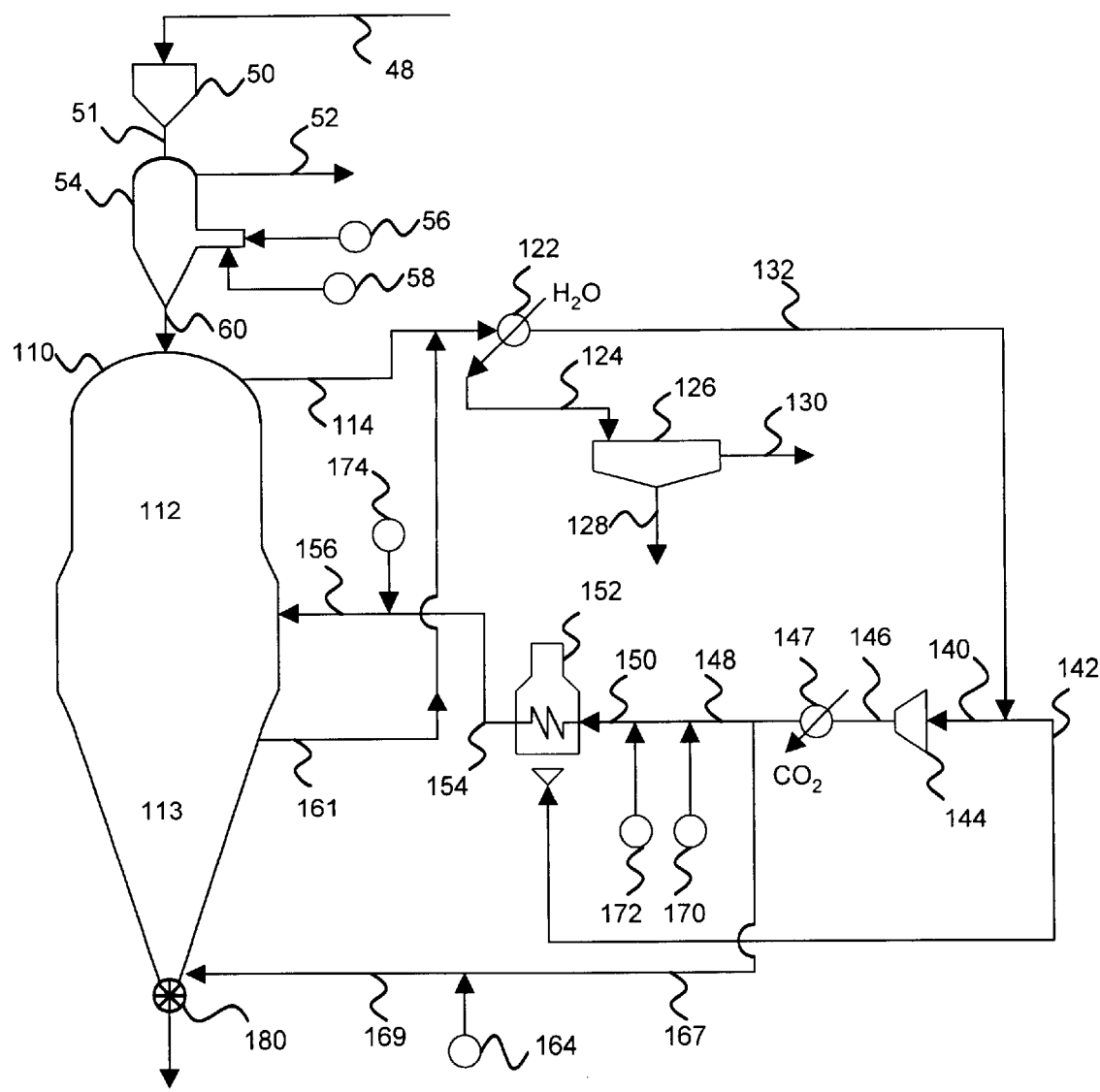
FIG. 4 illustrates schematically a similar embodiment to that shown in FIG. 2, modified to have a cooling gas flow but without a second compressor.

FIG. 4 shows a further embodiment of the invention based on FIG. 2 with the difference that the cooling of the DRI within the discharge zone 113 of the reactor 110 is effected by dividing a stream 167 off from the recycled reducing gas stream 148, and upgrading said stream 167 with a carbon-containing gas that can be natural gas 164 producing the cooling gas stream 169 which feeds the discharge zone 113. After contacting and sufficiently cooling the DRI within discharge zone 113, the partially spent cooling gas is withdrawn as stream 161 that can be combined with the off reducing gas stream 114. The cooling loop in the present embodiment does not requires a gas compressor as in the optional cooling loops shown on FIGS. 2 and 3, since the main gas is taken from the gas compressor 144. Because stream 167 has a lower $CO_2$ content and is upgraded with a carbon-containing gas 164 as natural gas, the resulting stream 169 in this scheme helps to increase the carbon content of the DRI produced and takes advance of the cracking reactions taking place within the discharge zone 113 to produce a stream 161 with a higher content of CO and $H_2$, which will be recycled to the reducing gas circuit.

It will be well understood by others skilled in the art that the essence of the invention can be practiced in other embodiments beyond those just specifically described.

What is claimed is:

1. A method for removing one or more undesirable generally toxic metals including at least one of zinc, lead, and cadmium from an iron-containing material, said method comprising:

sintering said iron-containing material producing at least one sinter mass and sinter flue gas;

crushing such sinter mass into oxidized sinter lumps for handling;

preheating said sinter lumps in a non-reducing atmosphere, if needed, to achieve a non-sticking temperature above 650° C.;

introducing said hot oxidized sinter lumps at such temperature above 650° C. into a moving bed reduction reactor;

introducing a hot reducing gas at a temperature above about 850° C. into said reduction reactor;

contacting said hot sinter lumps in said reduction reactor with a stream of said hot reducing gas thereby reducing said sinter lumps and entraining in said stream of reducing gas said undesirable metals in vaporized form and/or in the form of molten aerosols;

withdrawing from said reduction reactor the hot reducing gas used to reduce said sinter lumps as an off reducing gas containing and maintaining the vapors and/or aerosols of said undesirable metals;

cooling said off reducing gas to a temperature low enough to solidify the vapors and/or aerosols of the undesirable metals contained therein;

separating said solidified undesirable metals from said off gas; and withdrawing the resulting reduced iron-containing sinter lumps from said reduction reactor.

2. A method according to claim 1, wherein said iron-containing materials comprise electric arc furnace dusts and mill scale.

3. A method according to claim 2, wherein said iron-containing materials further comprises iron ore fines, sinter fines, and direct reduced iron fines.

4. A method according to claim 1, wherein said undesirable metals comprises compounds of zinc, lead, and cadmium.

5. A method according to claim 1, wherein said non-reducing gas is an oxidizing gas produced by the combustion of natural gas with an oxygen containing gas.

6. A method according to claim 1, wherein said hot sinter lumps fed to said reduction reactor have a temperature above about 700° C.

7. A method according to claim 1, wherein said hot sinter lumps fed to said reduction reactor have a temperature higher or equal to about 800° C.

8. A method according to claim 1, wherein said reducing gas is in a temperature range of about 850° C. and about 1200° C.

9. A method according to claim 1, wherein said off reducing gas is at a temperature higher or equal to 650° C.

10. A method according to claim 1, wherein said off reducing gas is at a temperature higher or equal to 900° C.

11. A method according to claim 1, further comprising recovering undesirable metals from said sinter flue gas.

12. A method according to claim 1, further comprising:

combining particles of said iron-containing material with particles of carbonaceous material; and sintering the resulting combination of said iron-containing and carbonaceous materials to produce said sinter mass.

13. A method according to claim 12, further comprising mixing electric-arc-furnace dust, a binder, and particles of coke;

adjusting the humidity of said mixture and forming micro-pellets of said mixture;

adding and mixing mill scale, lime, coke and other iron-containing fines to said micro-pellets pellets thereby forming enriched micro-pellets;

heating said enriched micro-pellets to a temperature sufficient to product a sinter mass;

breaking said sinter mass into sinter lumps which are of a size on the order of ¼ inch (8.9 mm) to 1½ inches (43.1 mm) in diameter; and recycling smaller sinter as at least part of said fines.

14. A method for producing sinter lumps of iron-containing materials including at least one of zinc, lead, and cadmium with a strength adequate for use in a moving bed reactor, which comprises:

mixing electric-arc-furnace dust, a binder and particles of coke;

adjusting the humidity of said mixture and forming micro-pellets of said mixture;

adding and mixing mill scale, lime, coke and other iron-containing fines to said micro-pellets pellets thereby forming enriched micro-pellets;

heating said enriched micro-pellets to a temperature sufficient to product a sinter mass;

breaking said sinter mass into sinter lumps which are of a size on the order of ¼ inch (8.9 mm) to 1½ inches (43.1 mm) in diameter; and recycling smaller sinter as at least part of said fines.

15. A method according to claim 14, wherein said micro-pellets have an average diameter on the order of about ⅜ in. (9.53 mm).

16. An apparatus for removing one or more undesirable metals from iron-containing particulate materials, said apparatus comprising:

a device for at least preheating said iron-containing particulate materials in a non-reducing atmosphere;

feeding means for feeding said iron-containing particulate materials to said device;

a first solids feed conduit connecting said feeding means and said device;

a reduction reactor for reacting a flow of hot reducing gas with a counterflow of said particulate materials to reduce the metals therein to volatilize certain of the unwanted metals and produce DRI;

a second solids feed conduit connecting said device with said reactor;

gas and entrained metallic materials cooling and gas/metallic materials separating combination;

a third gas conduit connecting said reduction reactor to said combination;

a compressor;

a fourth gas conduit connecting said combination and said compressor;

a $CO_2$ removal unit;

a fifth gas conduit connecting said compressor and said $CO_2$ removal unit;

a heater;

a sixth gas conduit connecting said $CO_2$ removal unit and said heater;

a seventh gas conduit connecting said heater back to said reduction reactor;

a reducing gas makeup source connected to feed into one of said gas conduits;

discharge means for regulated discharge of reduced iron-containing particles from said reduction reactor;

said device being a sinter plant that is connected via said second conduit to supply iron-containing containing particulate material in the form of still-hot sinter lumps to said reactor, and further comprising a separation unit for separating undesired metals from flue gas generated by said sinter plant.

17. An apparatus for removing one or more undesirable metals from iron-containing particulate materials, said apparatus comprising:

a preheater device for at least preheating said iron-containing particulate materials in a non-reducing atmosphere;

feeding means for feeding said iron-containing particulate materials to said device;

a first solids feed conduit connecting said feeding means and said device;

a reduction reactor for reacting a flow of hot reducing gas with a counterflow of said particulate materials to reduce the metals therein to volatilize certain of the unwanted metals and produce DRI;

a second solids feed conduit connecting said device with said reactor;

gas and entrained metallic materials cooling and gas/metallic materials separating combination;

a third gas conduit connecting said reduction reactor to said combination;

a compressor;

a fourth gas conduit connecting said combination and said compressor;

a $CO_2$ removal unit;

a fifth gas conduit connecting said compressor and said $CO_2$ removal unit;

a heater;

a sixth gas conduit connecting said $CO_2$ removal unit and said heater;

a seventh gas conduit connecting said heater back to said reduction reactor;

a reducing gas makeup source connected to feed into one of said gas conduits;

discharge means for regulated discharge of reduced iron-containing particles from said reduction reactor;

further comprising a sinter plant that is connected via said feeding means and said first conduit to supply iron-containing particulate material in the form of sinter lumps to said preheater, and still further comprising a separation unit for separating undesired metals from flue gas generated by said sinter plant.

* * * * *